(12) United States Patent
Yang et al.

(10) Patent No.: US 10,721,916 B2
(45) Date of Patent: Jul. 28, 2020

(54) TWO-STAGE MOLDED PET TOY

(71) Applicant: ZHUHAI HENGQIN SUPER TECHNOLOGY LTD., Zhuhai, Guangdong (CN)

(72) Inventors: Tianle Yang, Guangdong (CN); Yibao Zeng, Guangdong (CN)

(73) Assignee: ZHUHAI HENGQIN SUPER TECHNOLOGY LTD., Zhuhai (CN)

( * ) Notice: Subject to any disclaimer, the term of this patent is extended or adjusted under 35 U.S.C. 154(b) by 189 days.

(21) Appl. No.: 15/628,599

(22) Filed: Jun. 20, 2017

(65) Prior Publication Data

US 2018/0310527 A1 Nov. 1, 2018

(30) Foreign Application Priority Data

Apr. 28, 2017 (CN) .......................... 2017 2 0466828

(51) Int. Cl.
| | |
|---|---|
| *A01K 15/02* | (2006.01) |
| *A01K 13/00* | (2006.01) |
| *B29C 33/44* | (2006.01) |
| *B29C 65/02* | (2006.01) |

(52) U.S. Cl.
CPC ............ *A01K 15/026* (2013.01); *A01K 13/00* (2013.01); *B29C 33/442* (2013.01); *B29C 65/02* (2013.01); *A01K 15/025* (2013.01)

(58) Field of Classification Search
CPC .... A01K 15/025; A01K 15/026; A01K 13/00; B29C 33/442; B29C 65/02
USPC .................................................. 119/707, 709
See application file for complete search history.

(56) References Cited

U.S. PATENT DOCUMENTS

| 5,476,408 | A | * | 12/1995 | Hoeting | ................. | A63B 43/00 |
|---|---|---|---|---|---|---|
| | | | | | | 446/409 |
| 6,073,581 | A | * | 6/2000 | Wang | .................. | A01K 5/0114 |
| | | | | | | 119/51.01 |
| 2007/0022971 | A1 | * | 2/2007 | Renforth | .............. | A01K 15/026 |
| | | | | | | 119/707 |
| 2011/0277696 | A1 | * | 11/2011 | Rutherford | .......... | A01K 15/026 |
| | | | | | | 119/707 |
| 2012/0090554 | A1 | * | 4/2012 | Nunn | ................... | A01K 15/025 |
| | | | | | | 119/707 |
| 2012/0204809 | A1 | * | 8/2012 | Axelrod | ............... | A01K 15/026 |
| | | | | | | 119/709 |
| 2014/0299070 | A1 | * | 10/2014 | Harrington | .......... | A01K 15/025 |
| | | | | | | 119/707 |

(Continued)

*Primary Examiner* — Tien Q Dinh
*Assistant Examiner* — Brady W Frazier

(57) ABSTRACT

The disclosure provides a two-stage molded pet toy, which consists of a hard plastic liner which is primarily molded and a flexible material mantle which is secondarily molded and sleeves the liner, wherein the liner is a hollow shell formed by mutually butting half shells of upper and lower parts, openings are formed in its two opposite ends, multiple ribs are arranged perpendicular to a length direction of the liner in the liner, nicks are formed in all of the ribs, openings are also formed in two ends of the mantle respectively, and the openings in the two ends of the mantle correspond to the openings in the two ends of the liner respectively. The pet toy is multifunctional, and has both teething and food leakage functions; and in addition, the pet toy has advantages of the hard and flexible materials, and is multifunctional.

4 Claims, 4 Drawing Sheets

(56) References Cited

U.S. PATENT DOCUMENTS

| | | | |
|---|---|---|---|
| 2015/0237829 A1* | 8/2015 | Tsengas | A01K 15/025 |
| | | | 119/709 |
| 2015/0245593 A1* | 9/2015 | O'Mara | A01K 15/025 |
| | | | 446/457 |
| 2016/0081303 A1* | 3/2016 | Simon | A01K 15/025 |
| | | | 119/709 |
| 2016/0212975 A1* | 7/2016 | Wolfe, Jr. | A01K 5/0114 |

* cited by examiner

TWO-STAGE MOLDED PET TOY

CROSS-REFERENCE TO PRIOR APPLICATION

This application claims the benefit of Chinese Utility Model Application No. 201720466828.5 filed on Apr. 28, 2017, the contents of which are incorporated herein by reference.

TECHNICAL FIELD

The disclosure relates to the technical field of pet products, and particularly to a two-stage molded pet toy.

BACKGROUND

At present, there are multiple kinds of pet toys on the market, which may functionally be divided into food leakage toys and teething toys. Most of the pet boys are made from one material which is either too flexible or too hard. A pet toy which is made from a hard material has a poor mouth-feel, and may not arouse an interest of a pet in biting. A pet toy which is made from a flexible material is not durable enough, may be easily broken, and may even endanger health and life of the pet if being accidentally swallowed by the pet. There are also two-stage molded toys on the market. However, under limits of a molding technology and a mold design, at present, flexible plastic is secondarily injection-molded on the basis of solid hard plastic, or the hollow rubber is assembled in the flexible plastic and the outside flexible plastic is assembled in a bonding or forced interference manner, so that a product is non-integrated.

SUMMARY

The disclosure is intended to provide a two-stage molded pet toy.

The purpose of the disclosure is implemented by the following technical solution.

A two-stage molded pet toy may consist of a hard plastic liner which is primarily molded and a flexible material mantle which is secondarily molded and sleeves the liner, wherein the liner may be a hollow shell formed by mutually butting half shells of upper and lower parts, and openings may be formed in its two opposite ends; multiple ribs may be arranged at intervals in the half shells of the upper and lower parts of the liner along a length direction, and nicks may be formed in all of the ribs; and openings corresponding to the openings of the liner may also be formed in two ends of the mantle respectively.

Preferably, protruding surrounding edges may be arranged at the openings in the two ends of the liner respectively, and the openings in the two ends of the mantle may be closely connected with the surrounding edges respectively.

Preferably, the openings in the two ends of the mantle may be positioned at rear ends of the corresponding surrounding edges respectively, so that the openings in the two ends of the mantle may form two ports of the pet toy together with the surrounding edges at the two ends of the liner.

Preferably, the openings in the two ends of the mantle and the liner may be communicated with the nicks of the multiple ribs to form a through passage.

Preferably, the mantle may be a silicone rubber mantle or a thermoplastic elastomer plastic mantle.

Preferably, multiple teething objects may be distributed on a surface of the mantle.

Preferably, the upper and lower parts of the liner may be fixedly connected through a buckle or a stud.

The disclosure has the following beneficial effects.

The pet toy is produced from flexible and hard materials by two-stage molding, the liner is hard plastic and is hollow, and the ribs are arranged therein to realize supporting and food leakage prevention functions; the mantle is flexible plastic, and is provided with the teething objects; the pet toy is multifunctional, and has both teething and food leakage functions; in addition, the pet toy has advantages of the hard and flexible materials; the pet toy has a flexible surface and a good mouth-feel; under an action of the hard plastic of an inner layer, the flexible plastic is unlikely to be broken, and is durable; a surface layer is flexible, so that a pet is unlikely to be hurt during biting; moreover, the hollow hard plastic has a high anti-biting property, the phenomenon that food is extruded or crushed to make the inside difficult to clean is avoided, and it is ensured that the food may normally roll out; and when dry food collides with a hard wall in an inner cavity or the toy is shaken, a produced sound provides a good sensory discipline for the pet and improves interestingness.

Besides innovations about functions and structure of the product, the disclosure also makes innovations about a production process and breaks thinking limits, which is mainly reflected by the hollow inner layer. At present, a similar product on the market is molded by wrapping solid plastic with flexible plastic, and this is one of major breakthroughs of the disclosure. In terms of the structure of the product, the liner is divided into two halves, which has an advantage of convenience for molding and hollowing. A circle of protruding surrounding edge is arranged at each of the two ends, and may realize functions of supporting and plastic sealing during secondary molding and prevent the flexible plastic from flowing to a region outside the product in a molding process. In addition, reinforcing ribs are added inside to prevent the liner from being damaged by pressure during secondary molding. A multilayer support is adopted in terms of a mold, and besides protrusions at the two ends of the liner, a positioning shaft is also arranged in the middle, and this cross shaft penetrates through the center of the whole liner, and has both positioning and supporting functions.

DETAILED DESCRIPTION

In order to make the purpose, technical solution and advantages of the disclosure clearer, the disclosure will be further described below in detail with reference to the drawings and an embodiment. It should be understood that the specific embodiment described here is only adopted to explain the disclosure and not intended to limit the disclosure.

Figure 1:
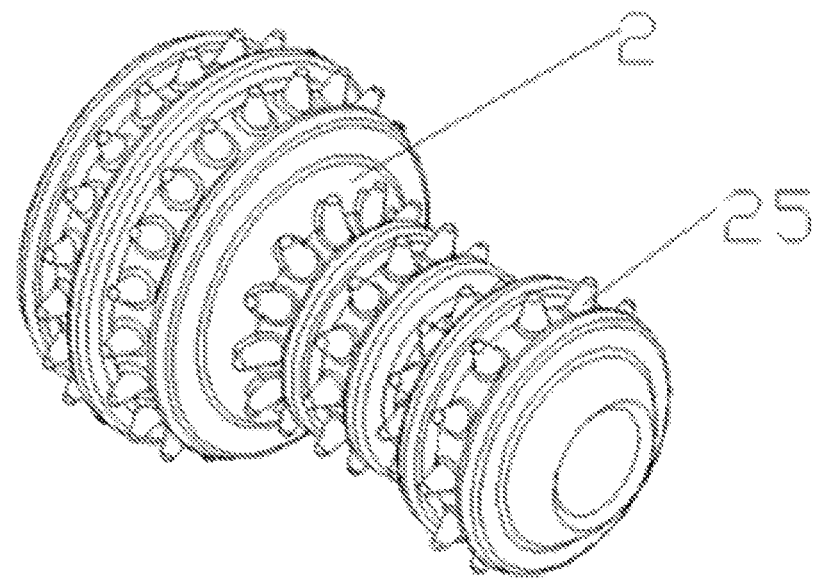
FIG. 1 is an overall structure diagram of a pet toy according to an embodiment of the disclosure.
Figure 2:
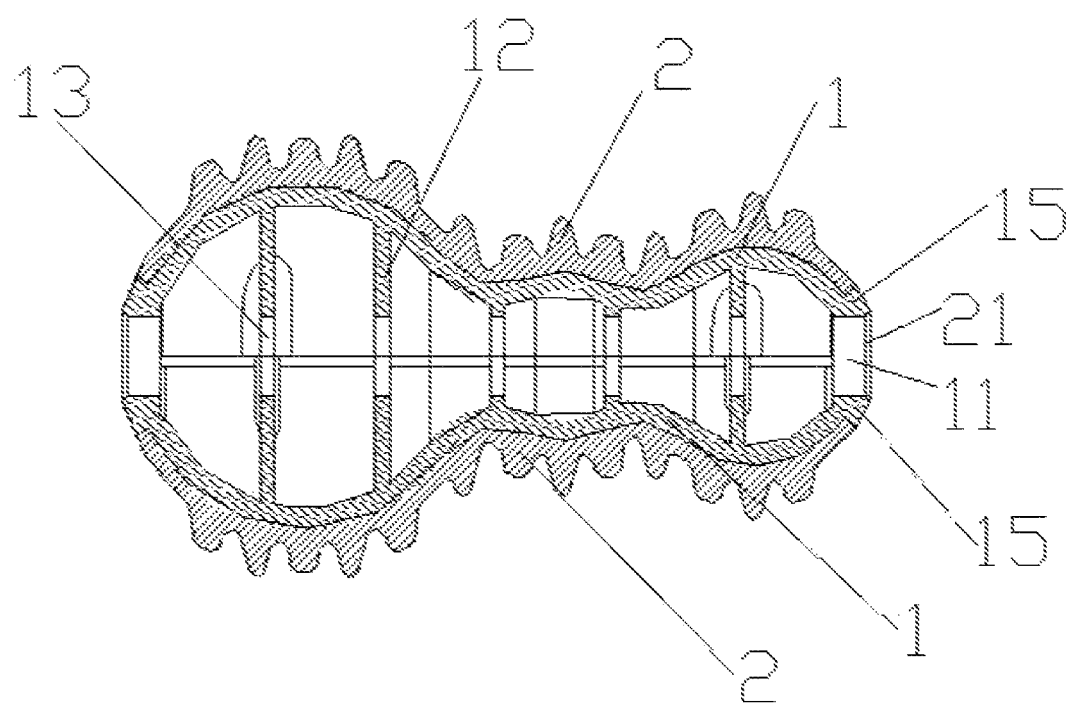
FIG. 2 is a sectional structure diagram of a pet toy according to an embodiment of the disclosure.
Figure 2:
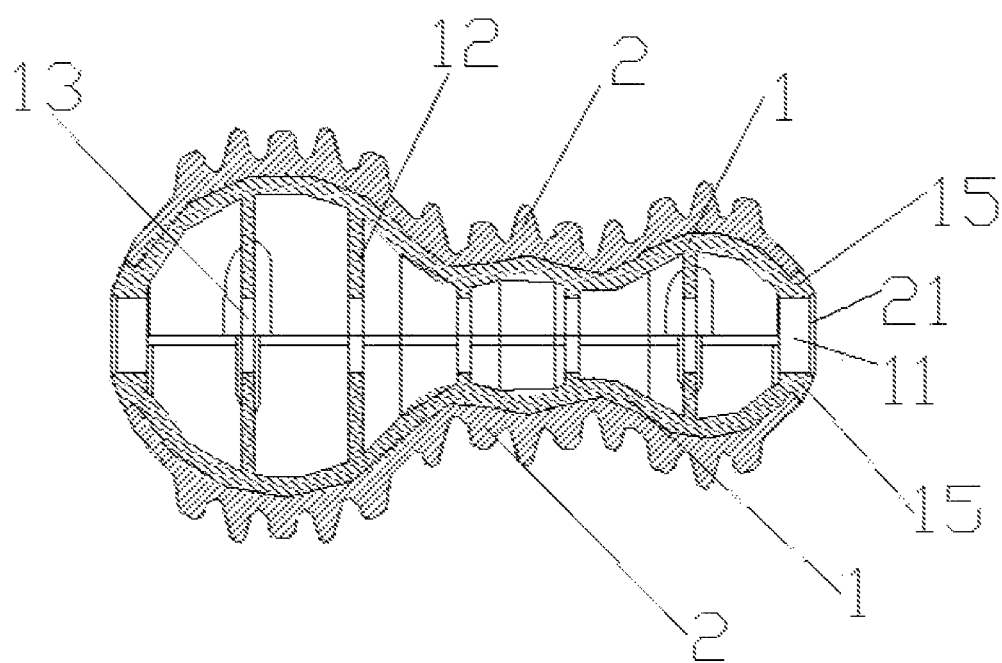
Figure 3:
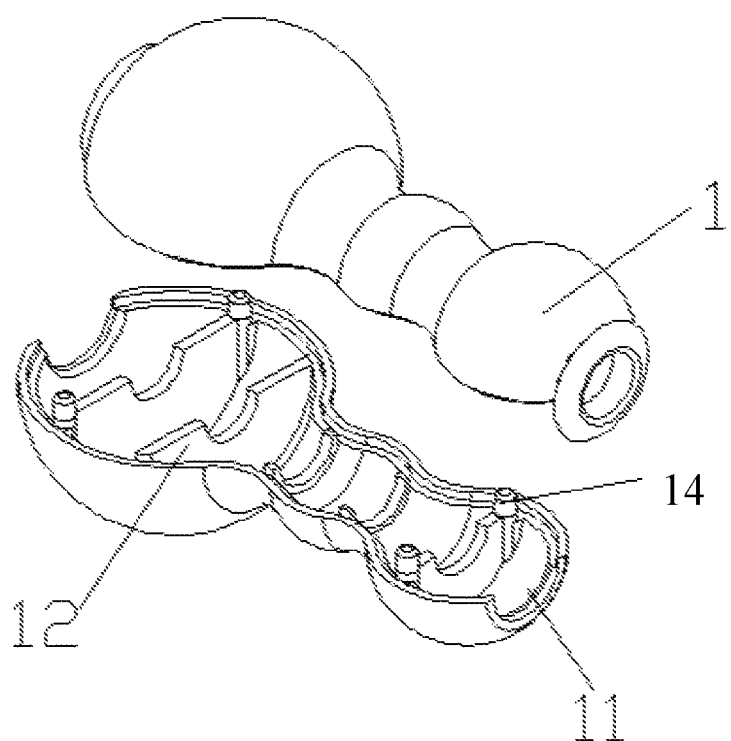
FIG. 3 is an exploded structure diagram of a liner of a pet toy according to an embodiment of the disclosure.

The embodiment provides a two-stage molded pet toy, which, as shown in FIG. 1 to FIG. 3, consists of a liner 1 and a mantle 2 sleeving the liner 1. The liner 1 is made from a hard plastic material, and is a hollow shell formed by half shells of upper and lower parts, openings 11 are formed in two ends, and the half shells of the upper and lower parts are connected through a buckle or a stud 14. Multiple ribs 12 are arranged at intervals in the half shells of the upper and lower parts of the liner 1 along a length direction, and are arranged to strengthen strength of the whole product, and nicks 13 are formed in all of the ribs 12. The mantle 2 is made from a flexible material, openings 21 are also formed in its two ends respectively, and the openings 21 in the two ends of the mantle and the openings 11 in the two ends of the liner 1 are correspondingly and closely connected to form openings in the two ends of the whole pet toy respectively. The nicks in the multiple ribs 12 are shaped as follows: the openings in the two ends of the mantle 2 and the liner 1 are communicated with the nicks 13 in the multiple ribs 12 to form a through passage. More specifically, the ribs 12 in the half shells of the upper and lower parts may longitudinally correspond on a plane in pairs, may also be arranged in a staggering manner, or partially correspond and are partially staggered as long as the nicks 13 in the ribs 12 are ensured to be communicated with the openings in the two ends of the whole pet toy.

Figure 4:
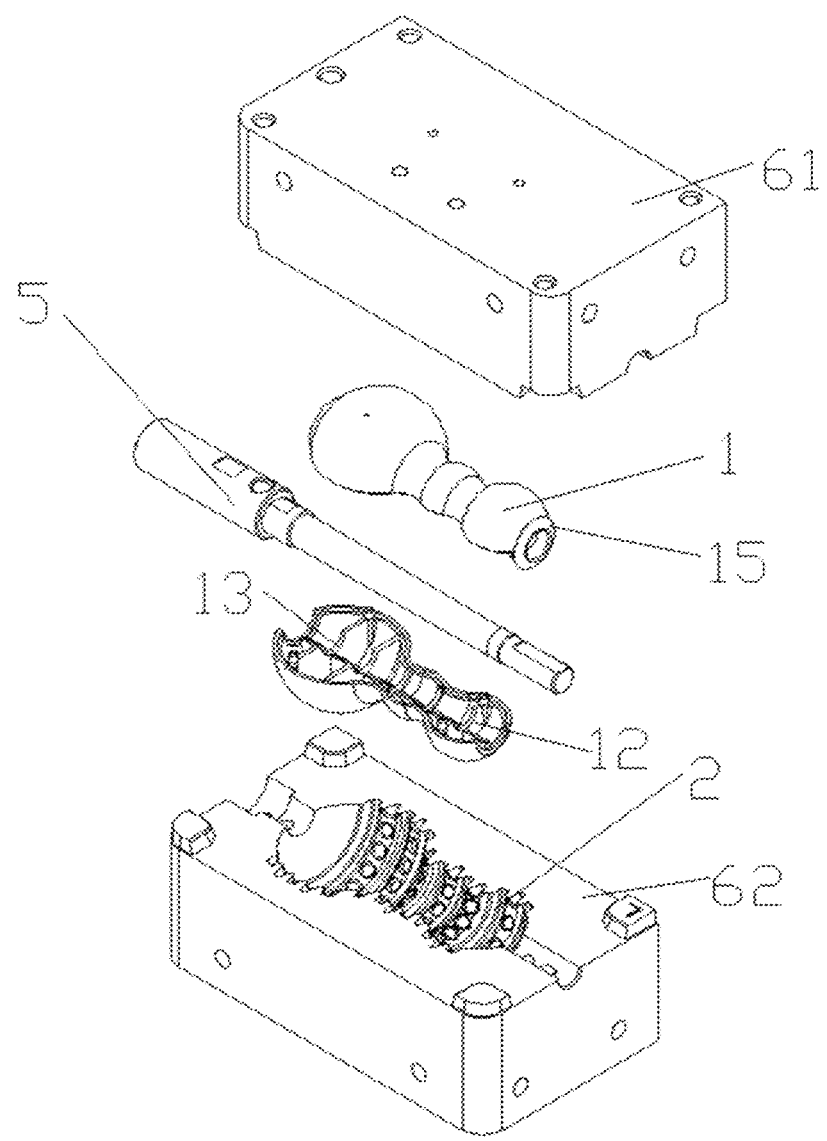
FIG. 4 is an exploded structure diagram of molding of a pet toy according to an embodiment of the disclosure.

As shown in FIG. 4, during preparation, the through passage is formed to place a positioning shaft 5 during molding, and the positioning shaft 5 penetrates through the openings 11 in the two ends of the liner 1 to fix the liner 1 in a mold (upper mold 61 and lower mold 62) to realize positioning and supporting functions during secondary molding. In addition, the openings in the two ends of the pet toy and the nicks 13 in the ribs 12 in the shell of the liner 1 may also realize a food leakage function. The ribs 12 may also reduce a probability of dropping of food and increase playing time and interestingness of a pet.

As shown in FIG. 2 and FIG. 3, a segment of protrusion is arranged at each of the two ends of the liner 1 to form a surrounding edge 15, and the protruded surrounding edges 15 realize positioning supporting and plastic sealing functions during molding. After two-stage molding is finished, the flexible plastic mantle 2 is flush and butted with the protruded surrounding edges 15. The protruding surrounding edges 15 may also improve a mouth-feel when the pet bites the toy, besides realizing the functions in the production process. On an outer part of the pet toy, i.e. a part which may be bit by the pet, the protruding parts are made from the hard plastic material, and the other part is a flexible plastic material, so that an outer surface which may be bit by the pet has both flexible and hard mouth-feels.

The mantle 2 may adopt an elastomer material such as silicone rubber and ThermoPlastic Rubber (TPR), and in terms of the molding process, hot compression molding and injection molding (hot compression molding is adopted for the silicone rubber and injection molding is adopted for the TPR) may be selected according to different materials for secondary molding. Teething objects 25 are distributed on a surface of the mantle 2, and have teething and tooth cleaning functions during biting of the pet.

A shape of the whole pet toy may be any shape.

The invention claimed is:

1. A two-stage molded pet toy, consisting of a hard plastic liner which is primarily molded and a flexible material mantle which is secondarily molded and sleeves the liner, wherein the liner is a hollow shell formed by mutually butting half shells of upper and lower parts, and openings are formed in its two opposite ends; multiple ribs are arranged at intervals in the half shells of the upper and lower parts of the liner along a length direction, and nicks are formed in all of the ribs; and openings corresponding to the openings of the liner are also formed in two ends of the mantle respectively;

wherein the liner further comprises protruding surrounding edges that are arranged at the openings in the two ends of the liner respectively, and the openings in the two ends of the mantle are elastically butted with the surrounding edges respectively, so that the openings in the two ends of the mantle may form two ends of the pet toy together with the surrounding edges at the two ends of the liner;

the surrounding edges are positioned outermost of the whole pet toy;

wherein the pet toy is provided with multiple teething objects distributed on a surface of the mantle.

2. The pet toy according to claim 1, wherein the openings in the two ends of the mantle and the liner are communicated with the nicks of the multiple ribs to form a through passage.

3. The pet toy according to claim 1, wherein the mantle is a silicone rubber mantle or a thermoplastic elastomer plastic mantle.

4. The pet toy according to claim 1, wherein the upper and lower parts of the liner are fixedly connected through a buckle or a stud.

* * * * *